United States Patent Office 3,257,124
Patented June 21, 1966

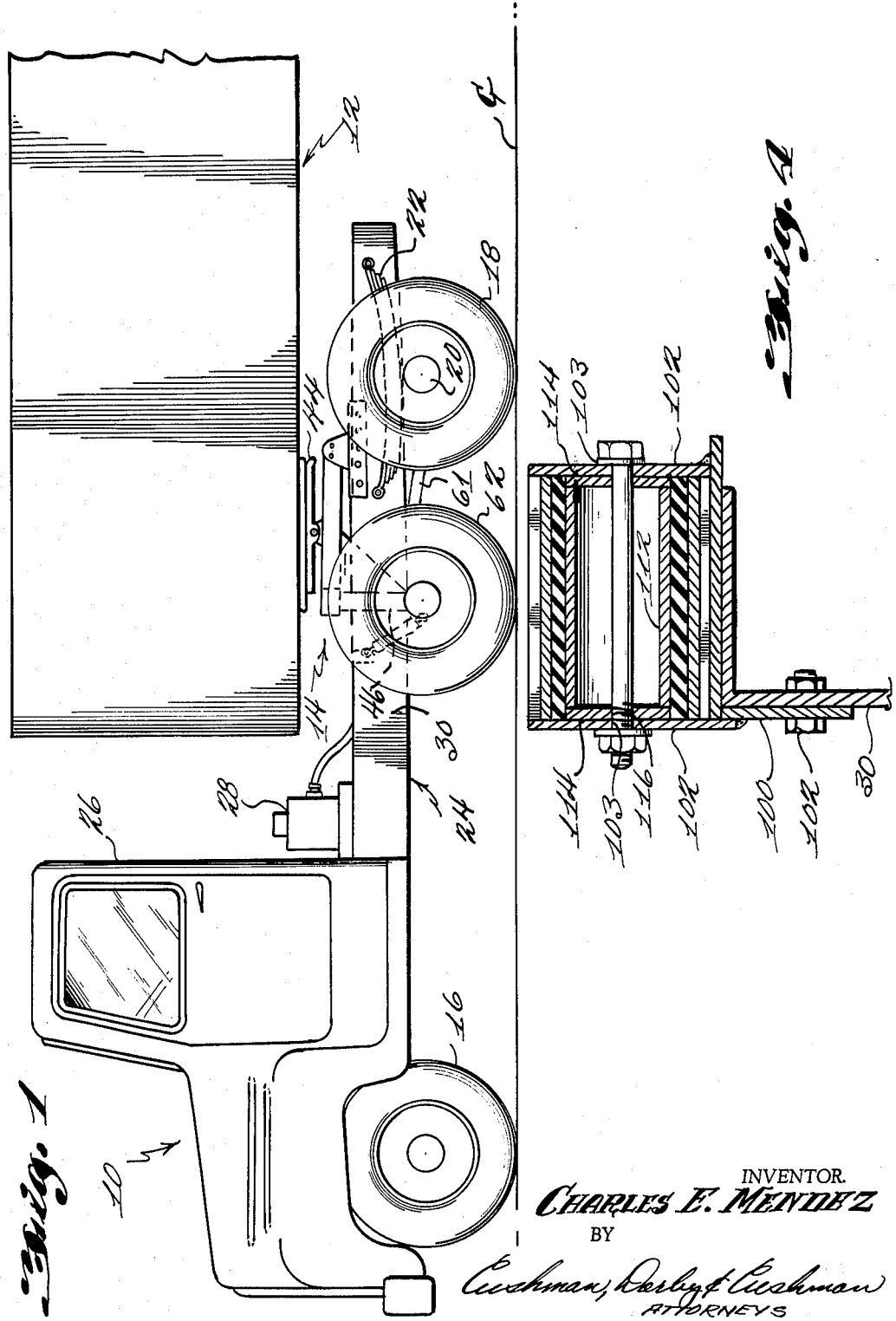

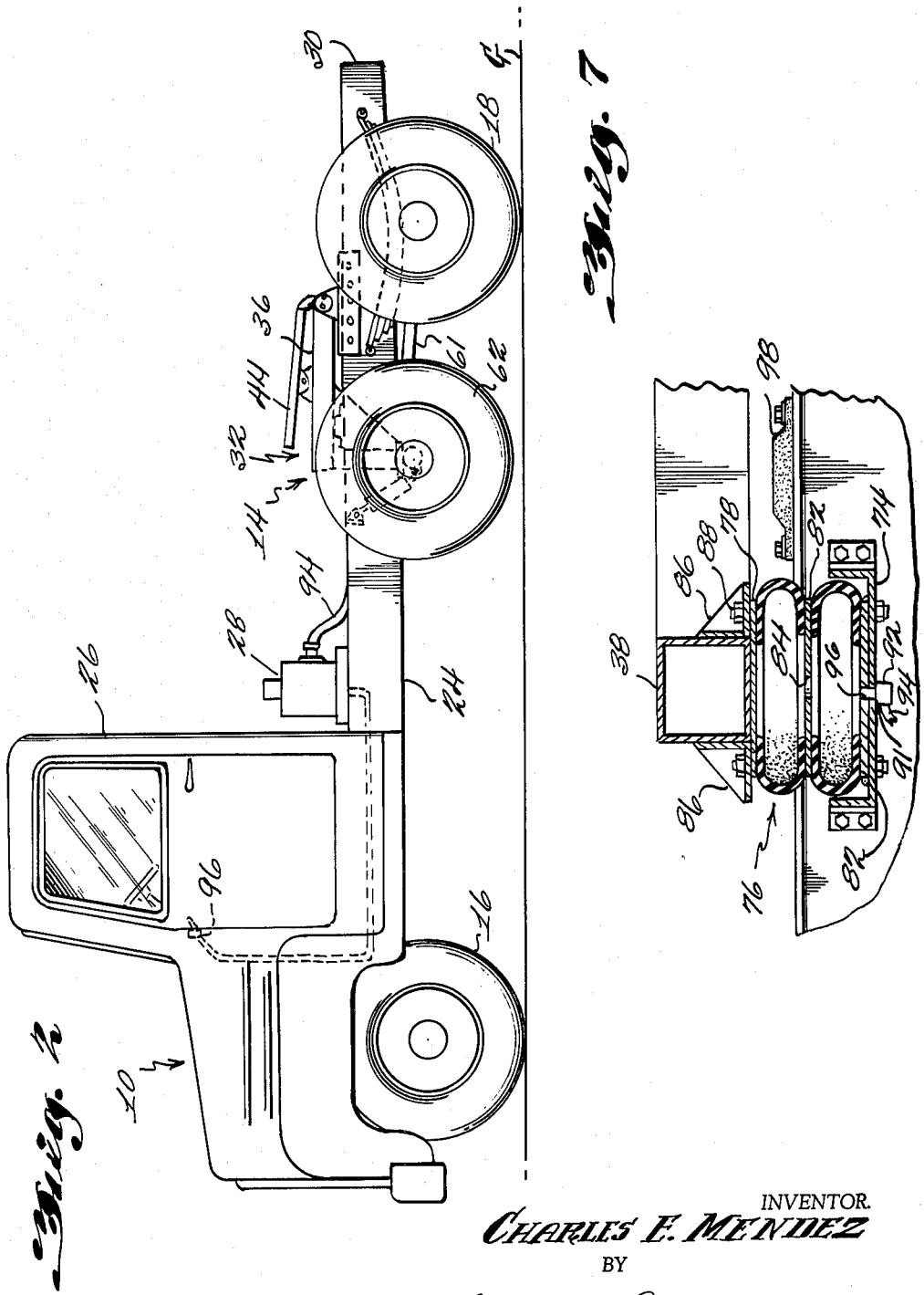

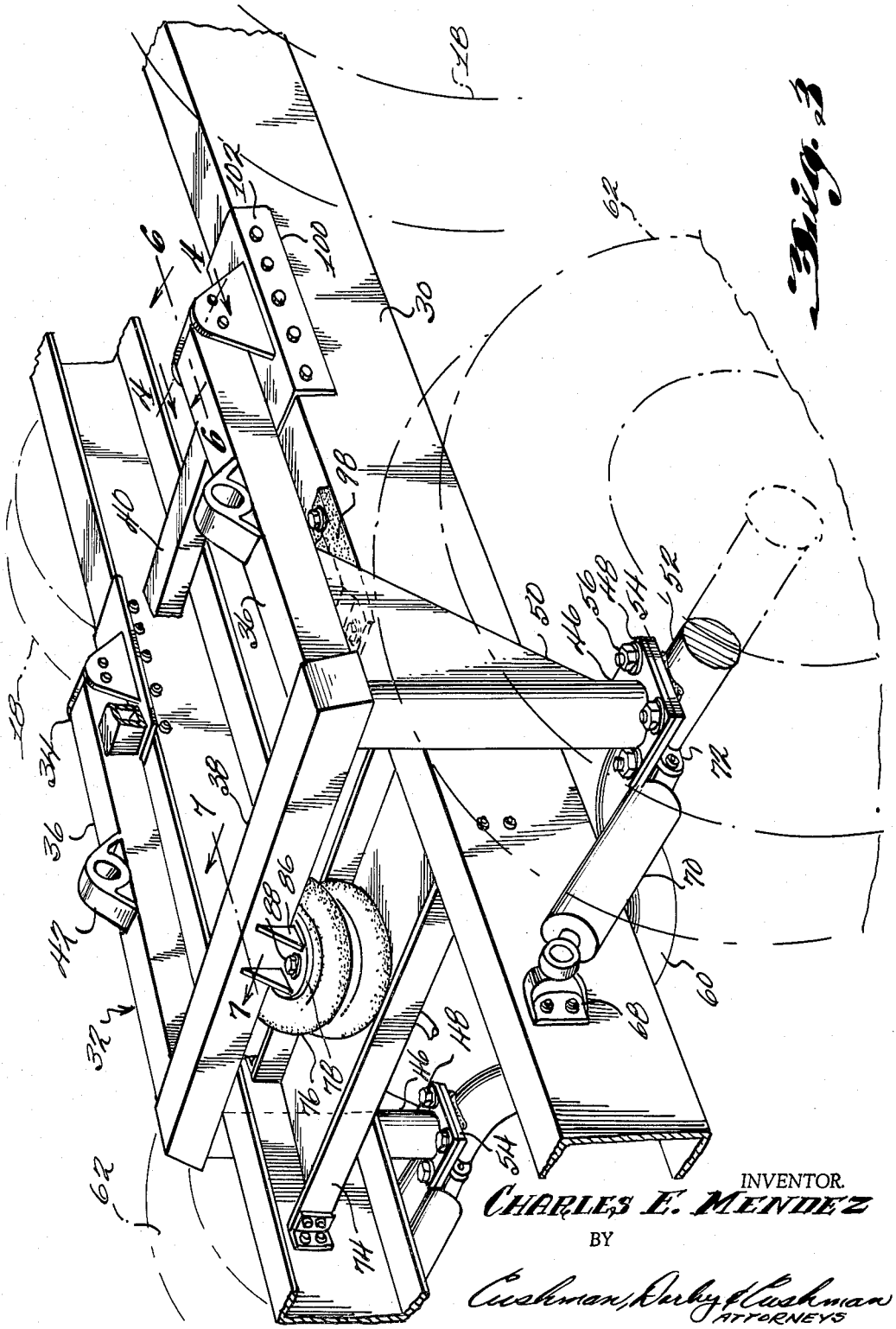

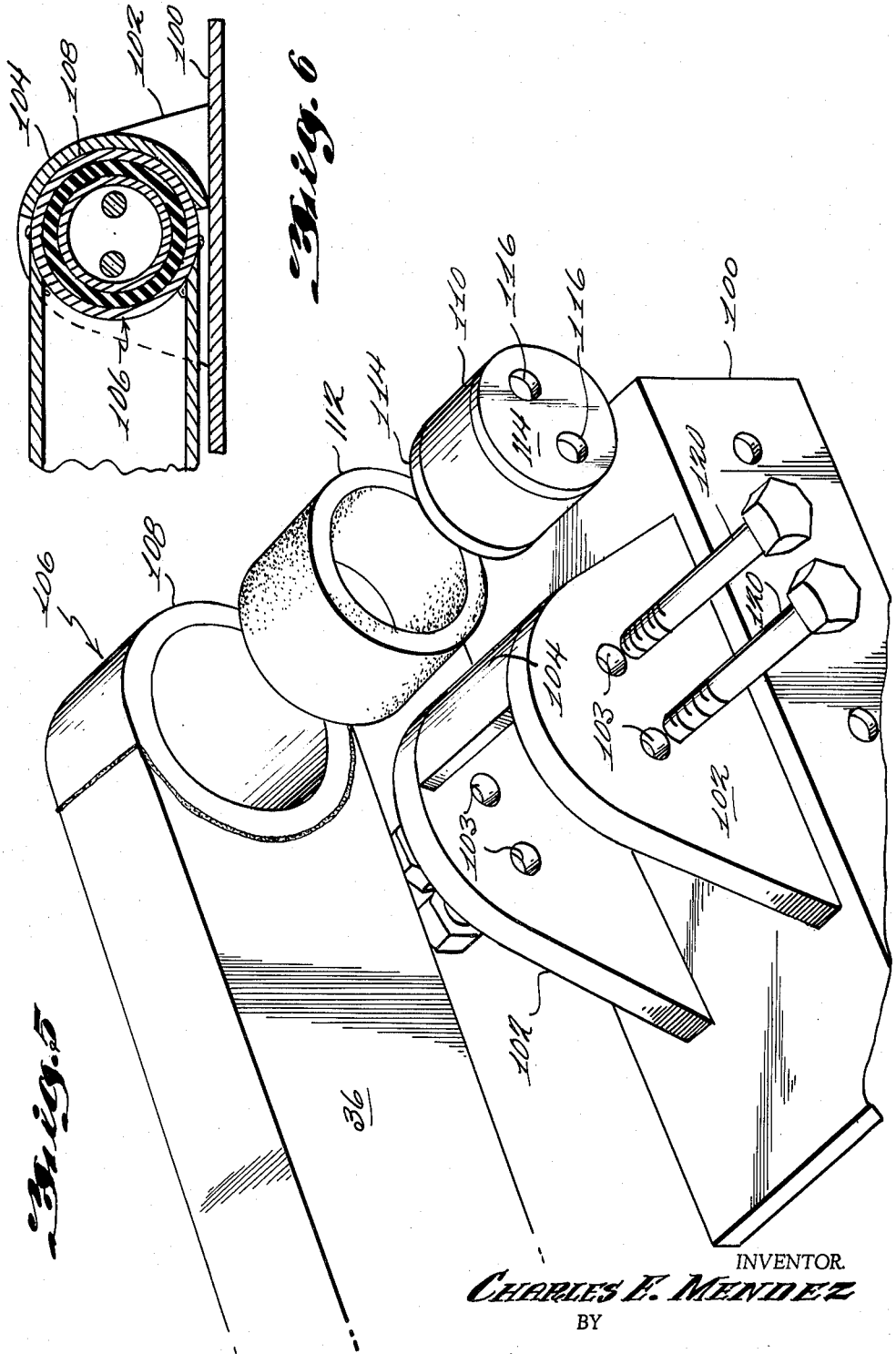

3,257,124
ATTACHMENT OF AUXILIARY OVERLOAD AXLE IN WHEEL ARRANGEMENT FOR TRUCK TRACTOR
Charles E. Mendez, P.O. Box 426, Tampa, Fla.
Filed Oct. 15, 1962, Ser. No. 230,327
8 Claims. (Cl. 280—405)

The present invention relates to an attachment for converting a tractor from a single-axle tractor into a tandem-axle tractor, and, more particularly, to an auxiliary overload axle and wheel arrangement which may be readily attached or detached from the tractor frame or be placed in operation or rendered inoperative depending upon load conditions.

While the invention is primarily intended for use on tractors for pulling semi-trailers of the type having a steering axle and wheel assembly and one driving axle and wheel assembly to convert the same into a tandem arrangement for one of the axle assemblies, it will be readily understood the arrangement is also capable of use on tandem tractors to provide a still further axle and wheel assembly to accommodate overload conditions.

Tractors of the type utilized in pulling semi-trailers have the engine power to pull a heavier load than the chassis of the tractor can withstand. In other words, the weight of the semi-trailer which is distributed to the tractor chassis through the king pin and fifth wheel on the tractor chassis is limited to the strength of the chassis and not to the pulling power of the engine of the tractor. The present invention contemplates providing an axle and wheel assembly which can be attached to the chassis of the tractor and which will permit the tractor to be utilized for hauling semi-trailers having loads greater than those normally carried by the tractor.

Heretofore, auxiliary overload axle and wheel arrangements have been installed in order to accommodate a portion of the load which would normally be distributed through the tractor chassis to the conventional running gear, but such previous arrangements have been costly to manufacture and install and, once installed, were difficult to remove. Generally, the auxiliary overload axle and wheel arrangement trailed the driving axle and wheel arrangement and necessarily positioned the wheels of the same further away from the steering axle and wheel arrangement. This made the tractor difficult to turn as it placed unnecessary loads on the chassis during a turn. To accommodate for this, complicated arrangements were made for turning the auxiliary wheels, but such arrangements proved too expensive and difficult to maintain.

An object of the present invention is to provide an attachment of an axle and wheel assembly for easily converting a tractor or the like into a tandem-axle vehicle.

Another object of the present invention is to provide an attachment of an axle and wheel assembly which carries with it a fifth wheel and through which the load of a semi-trailer may be distributed to the conventional running gear and to the auxiliary axle and wheel assembly.

Still another object of the present invention is to provide an auxiliary overload axle and wheel assembly which may be easily attached or removed from the chassis of a tractor and, when attached, is automatically rendered inoperative when the load on the fifth wheel assembly is below a predetermined value. In other words, when the load transmitted through the fifth wheel is below a predetermined value, the wheels of the auxiliary overload axle and wheel assembly are automatically raised off the ground so that unnecessary wear on the tires of such wheels is eliminated.

Ancillary to the preceding object, it is a further object of the present invention to provide an auxiliary overload axle and wheel arrangement in which the load distributed between it and the driving axle and wheel assembly can be varied by the operator of the vehicle under different driving conditions. For example, if the vehicle is stuck in snow, mud or the like and it is desirable to place an increased load on the driving axle, at least a portion of the load on the auxiliary axle and wheel assembly can be fixed to the driving axle and wheel assembly.

Still another object of the present invention is to provide an auxiliary axle and wheel assembly for accommodating overload conditions, the tandem arrangement provided thereby being such that full traction is provided on the drive axle of the vehicle regardless of terrain encountered. For example, if one of the wheels of the drive axle goes into a hole, a clearance between the tractor frame and the auxiliary axle and wheel assembly would increase sufficiently to allow necessary weight on the rear axle of the tractor to get out of the hole. Also, if a hole is encountered by a wheel of the auxiliary axle and wheel assembly, the weight of such assembly would automatically be transferred to the tractor frame adding more weight to the drive axle to insure proper traction.

A further object of the present invention is to provide a frame structure for an auxiliary axle and wheel assembly which is automatically aligned with the chassis frame when assembled on the chassis frame.

Another object of the present invention is to provide a connection for the frame structure of an auxiliary axle and wheel assembly in which the load is not transferred horizontally through the bushings when the vehicle is in motion but is directly transferred from the frame structure to the chassis.

A further object of the present invention is to provide a connection between the frame structure of an auxiliary axle and wheel assembly and the chassis of a tractor which eliminates shocks being transferred from such wheels through the frame structure to the chassis.

Still another object of the present invention is to provide an auxiliary axle and wheel including a frame structure carrying the fifth wheel, the auxiliary axle and wheel assembly being mounted as a pusher axle and wheel assembly so that the wheels of the same are positioned closer to the steering gear.

Ancillary to the preceding object, it is a further object of the present invention to arrange the fifth wheel on the auxiliary axle and wheel assembly frame structure in such a manner that the load transferred from the semi-trailer to the frame structure of the auxiliary axle and wheel assembly is forward of the rearmost driving axle and wheel assembly.

These and other objects and advantages of the invention will appear more fully in the following specification, claims and drawings in which:

FIGURE 1 is a side elevational view of a tractor utilizing the auxiliary overload axle and wheel arrangement of the present invention, the view showing a semi-trailer attached to the fifth wheel with a rear portion of the semi-trailer broken away;

FIGURE 2 is a side elevational view similar to FIGURE 1 but illustrating the present invention with the overload wheels raised off the ground when no load or a load of less than the predetermined value is applied through the fifth wheel, the semi-trailer being omitted for purposes of clarity;

FIGURE 3 is an enlarged fragmentary perspective view partly in section and illustrating the auxiliary overload axle and wheel assembly of the present invention attached to the tractor chassis;

FIGURE 4 is an enlarged sectional view taken on the line 4—4 of FIGURE 3 and illustrating the bearing arrangement and attachment of the present invention to the chassis of the tractor;

FIGURE 5 is an enlarged exploded perspective view of the bearing arrangement and attachment for the pivoting frame structure of the present invention to the truck chassis;

FIGURE 6 is a sectional view taken on the line 6—6 of FIGURE 3;

FIGURE 7 is an enlarged sectional view taken on the line 7—7 of FIGURE 3.

Referring now to the drawings wherein like character or reference numerals represent like or similar parts, and, in particular, to FIGURES 1 and 2, a conventional four-wheel tractor 10 is illustrated towing a semi-trailer 12 by means of an overload axle and wheel assembly attachment 14 of the present invention. The tractor 10 has the usual front wheels 16 used for steering and the rear or drive wheels 18. The drive wheels 18 are provided with a drive axle 20 and are spring mounted in the usual manner by springs 22. Likewise the front wheels 16 are spring mounted in the conventional manner. The truck tractor 10 further includes a chassis or main frame structure, generally indicated at 24, on which is mounted the driver's cab 26 and engine (not shown). For purposes of illustration, the usual compressor 28 is mounted just aft of the driver's cab, the compressor being shown schematically and being either independently driven or driven off the engine.

The chassis 24 of the tractor 10 is provided with a pair of rearwardly-extending longitudinal frame members 30 suitably braced by cross members, one being illustrated at 74 in FIGURE 3. The frame members 30 may be channel shaped as shown or of any other suitable structural shape. Usually a fifth wheel is mounted on one of the cross members, between the frame members 30; but, in the arrangement of the present invention, the conventional tractor 10 is modified to the extent that the conventional fifth wheel is removed.

Referring now to FIGURE 3, the overload axle and wheel assembly attachment 14 includes a main frame structure 32 pivotally mounted as indicated at 34 to the longitudinal frame members 30 of chassis 24 on a pivotal axis arranged transverse of the longitudinal axis of the chassis and above the same. Frame structure 32 includes a pair of parallel longitudinally-extending frame members 36 spaced apart a distance substantially the same as the distance between the longitudinal frame members 30 of chassis 24 and cross members 38 and 40. The longitudinal members 36, which are positioned in alignment with and above the frame members 30, and cross members 38 and 40 are welded together forming an integral unit and may be of box-beam construction or the like. Longitudinal side members 36 of frame structure 32 are provided with aligned trunnions 42 on which is mounted a fifth wheel (FIGURES 1 and 2) 44 of any preferred construction.

As mentioned above, the longitudinal side frame members 36 are positioned directly above the respective longitudinal frame members 30 of the tractor chassis 24. Consequently, the forwardmost cross member 38 is of a length slightly greater than the distance between the longitudinal frame members 30 so that the ends of the same extend beyond the respective frame members 30. Depending downwardly from each of the ends of the cross members 38 are vertical columns 46, the pair of columns 46 having flange plates or bolting plates 48 welded thereto at the lower ends thereof. Gussets 50 brace the columns 46 to the respective longitudinal frame members 36 in order to provide a rigid assembly.

An auxiliary tandem axle 52 having bolting plates 54 welded thereto on its upper surface is adapted to be secured to the plates 48 by means of bolts 56. The auxiliary tandem or pusher axle 52 is provided with a downwardly-curved center portion 60 (FIGURE 3) in order to provide clearance for the main drive shaft 61 of tractor 10.

A pair of wheels 62 are carried on the outer ends of the pusher axle 52, the wheels 62 having generally the same tread as the drive wheels 18. After the axle 52 with wheels 62 has been bolted to the lower end of the columns 46 as described above, brackets 68 are bolted to the longitudinal frame members 30; and shock absorbers 70 are connected to the brackets 68 and to a lug 72 provided on the bolting 54.

A cross member 74 extending between and secured to the spaced longitudinal frame members 30 is provided immediately below the cross member 38 of frame structure 32. The cross member 74, which may be channel-shaped, provides a support for an air spring or bellows 76. The air spring or bellows 76 is of conventional construction and as shown includes two convolutions with an upper rigid member 78 (FIGURE 7) and a lower rigid member 80. A rigid plate 82 is provided intermediate the convolutions, the plate having an aperture or hole 84 therethrough in order to provide open communication between one convolution and the other. While the air spring has been disclosed with two convolutions, of course it could be made with just one convolution or any number of convolutions. Suitable brackets 86 carried by cross member 38 are used to secure the bellows to the cross member and to the channel-shaped member 74 by means of the bolts 88. An aperture or hole 90 provided in the lower rigid member 82 coincides with an aperture or hole 91 in the channel-shaped member 74 and is adapted to receive a fitting or elbow 92 connected to a flexible air hose or conduit 94 extending to the compressor 28. Air pressure at predetermined values can be established in the air spring 76 by a control unit 96 positioned in the cab 26 of the truck and operatively connected to the compressor 28.

On each of the longitudinal members 30 of chassis 24 are upwardly-extending rubber bumpers 98 which act as stops and limit the downward angular movement of the axle and wheel assembly 14 when the load applied through the fifth wheel is less than a predetermined value. In other words, when the tractor 10 is hauling the semi-trailer 12 fully loaded, the weight of the semi-trailer transferred through the king pin of the same and the fifth wheel 44 is distributed to the chassis 24 and to the auxiliary axle and wheel assembly 14. This weight will cause the chassis of the tractor to settle on the springs 22, and, as the chassis approaches the axle 20, a portion of the load will be distributed through the columns 46 to the axle 52 and wheel 62. When the load is removed from the semi-trailer or the semi-trailer is completely removed from the tractor, the entire chassis 24 of the tractor 10 will move upwardly relative the front wheels 16 and driving wheels 18 because of the spring suspension of the same, and the frame structure 32 will pivot downwardly to a position where the underneath surface of the longitudinal members 36 engages the upwardly extending stops or bumpers 98. By making the length of the tubular pipe columns 46 a specified amount dependent upon their position with respect to the pivotal axis of frame structure 32, it will be understood that when the spring suspension system of the conventional tractor is able to lift the chassis a certain distance with respect to the ground G, it will cause the bumpers to engage the members 36 and lift the pusher axle 52 upwardly with respect to the ground and, thus, raise the wheels 62 off the ground as shown in FIGURE 2.

The air spring 76 may be utilized to positively lift the wheels 62 off the ground under certain operating conditions. For example, if it is desired to transfer some or all of the load from the wheels 62 to the driving wheel 18 should the vehicle become stuck in snow or mud, the driver can operate the control 96 to increase the air pressure within the air spring 76, thus causing the frame structure 32 to pivot in a counter-clockwise direction, as viewed in FIGURES 1 to 3, thus causing the axle 52 and its wheels 62 to be raised upwardly. On the other hand, the air pressure within the air spring 76 may be varied to different pressures in order to shift the load between the main driving axle 20 and wheels 18 and the auxiliary axle and wheel assembly 14.

The frame structure 32, as previously explained, is pivotally connected to the members 30 of chassis 24. In more detail, and referring to FIGURES 4, 5 and 6, mounting brackets 100 are fixedly attached to the longitudinal members 30 by means of bolts 120. Each bracket 100 is provided with a pair of parallel upstanding flanges 102 having spaced bolt holes 103 therein, the flanges of one bracket being spaced apart a distance sufficient to receive the ends of longitudinal members 36. The flanges or gussets 102 of each angle bracket 100 are connected or tied together by an arcuate backup plate 104. The arcuate backup plate 104 in section is slightly less than a semicircle in order that there may be pivotal movement of the longitudinal members or arms 36.

A journal bearing generally designated at 106, is provided at the terminal free ends of the longitudinal members 36 of frame structure 32. In more detail, the journal bearing includes a tubular sleeve 108 welded to the ends of the members 36 as shown in FIGURE 5, the sleeve having an outside diameter and curvature complementary to the curvature of the arcuate backup plate 104. A rigid cylindrical core 110 having a rubber bushing 112 vulcanized to its outer surface is press fitted into the sleeve bearing 108. The rigid cylindrical core 110 may be solid or it may be constructed as shown in FIGURES 5 and 6 from a tubular member 112 having its ends capped as indicated at 114. The capped ends are provided with holes 116 which are adapted to align with the holes 103 in the upstanding plates 102 of angular bracket 100.

In assembling the auxiliary axle and wheel assembly 14 on the tractor 10, it will now be apparent that the frame 32 less the axle 52 and wheels 62 is attached to the brackets 100 by slipping the ends of the respective longitudinal members 36 between the respective pairs of plates 102 of brackets 100. Once the ends of the arms 36 have been slipped into position, the rear outer curved end of the bearing 108 bears against the end of the backup plate 104. Bolts 120 extending through the holes 103 of plates 102 and the holes 116 of cylindrical core 110 rigidly secure the cylindrical core 110 to the chassis 24 of the tractor 10. However, the frame structure 32 can pivot on the rubber bushing upwardly and downwardly as desired.

Once the frame structure 32 has been attached to the vehicle, then the axle 52 and wheels 62 are connected beneath the chassis to the lower ends of the downwardly depending columns 46. The air cylinder 76 is positioned between and secured to the cross member 38 and the cross member 74 and then suitably connected to the compressor 28 by the air hose or conduit 94. Shock absorbers 70 are then installed.

By providing a bearing arrangement, as described in detail above with the rubber bushing 112, the rubber bushing has enough elasticity to eliminate any shocks on the tractor chassis 24 when the frame structure 32 is pivoted. Also, by providing arcuate backup plate 104, a direct pull on the rubber bushing 112 is eliminated as the outer curved surface of bearing 108 bears directly against the inner surface of the backup plate 104. In addition, the backup plates 104 assist in aligning the entire frame structure 32 when assembled on top of the chassis 24 and maintaining such alignment even when the vehicle is turning.

Having set forth the nature, objects and advantages of the present invention, it will now be apparent that certain changes, adjustments and modifications may be made without departing from the principle and spirit of the invention. Therefore, the terminology used in this specification is for the purpose of description and not limitation, the scope of the invention being defined in the claims.

What is claimed is:

1. In a tractor for towing semi-trailers or the like, the combination comprising: a tractor chassis having a substantially rigid frame including longitudinal members extending rearwardly thereof; a driving axle and wheel assembly spring mounted beneath said rigid frame; a pusher axle and wheel assembly mounted forward of said driving axle and wheel assembly; means for supporting said pusher axle and wheel assembly for angular movement relative said chassis in a vertical plane parallel to the longitudinal axis of said chassis, said last-mentioned means including a frame structure pivotally connected to the longitudinal members of said rigid frame on a pivotal axis transverse of and above the longitudinal members of the chassis for supporting a load on said tractor chassis, said frame structure including a pair of longitudinal frame members connected together by at least one cross member and downwardly depending columns for supporting the pusher axle and wheels; said rigid frame having a portion thereof for engaging and limiting the downward angular movement of said supporting frame structure, and said downwardly depending columns of said supporting frame structure being of a length that supports the wheels of the pusher axle off the ground when there is no load on said tractor chassis and when the supporting frame structure is in its lowermost position as limited by contact with said portion of said rigid frame.

2. The tractor of claim 1 wherein said portion of said rigid frame for limiting downward angular movement of said supporting frame structure comprises said longitudinal members of said rigid frame and including bumpers extending upwardly from the longitudinal members of said tractor chassis for abutting engagement with the longitudinal frame members of said supporting frame structure.

3. The tractor of claim 1 including a transverse frame member extending between the longitudinal frame members of said supporting frame structure and including means for positively moving said pusher axle and wheel assembly in an upwardly angular movement, said last named means comprising an air spring positioned between said transverse member and the tractor chassis, and means for increasing and decreasing air pressure therein.

4. The tractor of claim 1 wherein said pivotal axis of said supporting frame structure lies in a vertical plane intermediate said driving axle and wheel assembly and said pusher axle and wheel assembly.

5. In a tractor for towing semi-trailers or the like, the combination comprising: a tractor chassis having a substantially rigid frame including longitudinal members extending rearwardly thereof; a driving axle and wheel assembly spring mounted beneath said rigid frame; a pusher axle and wheel assembly mounted forward of said driving axle and wheel assembly; means for supporting said pusher axle and wheel assembly for angular movement relative said chassis in a vertical plane parallel to the longitudinal axis of said chassis, said last-mentioned means including a frame structure for supporting a load on said tractor chassis, said frame structure being pivotally connected to the longitudinal members of said rigid frame on a pivotal axis transverse of and above the longitudinal members of the rigid frame, said frame structure including a pair of longitudinal frame members connected together by at least one cross member and downwardly depending columns for supporting the pusher axle and wheels; supporting means for supporting the wheels of the pusher axle off the ground when there is no load on said tractor chassis, said supporting means including a portion of said rigid frame of the tractor chassis for engaging said frame structure and for limiting its downward movement, and said downwardly depending columns being of a length that they hold the wheels of the pusher axle off the ground when said frame structure is in its lowermost position as limited by contact with said portion of said rigid frame when there is no load on said tractor chassis; means for pivotally connecting said frame structure to the longitudinal members of said rigid frame, said means comprising a cylindrical journal bearing at one end of each of the longitudinal frame members of said frame structure; an elastomeric bushing having a rigid cylindrical core member, said bushing being press fitted into the journal bearing; a bracket carried on each longitudinal member of said rigid frame, each bracket having a pair of upstanding parallel plates to which said cylindrical core is fixedly attached therebetween.

6. The tractor of claim 5 wherein each longitudinal frame member of said frame structure has an arcuate terminal end adjacent said bearing and wherein said bracket member includes an arcuate plate extending between said upstanding parallel plates, said arcuate plate being complementary to the arcuate terminal end of the respective longitudinal frame members of said frame structure.

7. The tractor of claim 5 including a fifth wheel assembly carried by said frame structure and wherein said portion of said rigid frame comprises the longitudinal members of said chassis and including bumpers extending upwardly from the longitudinal members for engaging the longitudinal frame members of said frame structure to support the wheels of the pusher axle off the ground when there is no load on said fifth wheel.

8. The tractor of claim 5 including a fifth wheel assembly carried by said frame structure, a cross member extending between the longitudinal members of said chassis and an air spring positioned between said cross member of said chassis and the cross member of said frame structure, said air spring having means for increasing and decreasing air pressure therein.

References Cited by the Examiner
UNITED STATES PATENTS

| | | | |
|---|---|---|---|
| 1,223,505 | 4/1917 | Martin | 180—14 |
| 1,886,143 | 11/1932 | Zaparka | 267—54 X |
| 2,698,668 | 1/1955 | McKay | 280—423 X |
| 2,713,498 | 7/1955 | Brown | 280—104.5 |
| 2,816,776 | 12/1957 | Nimtz | 280—423 |
| 2,952,326 | 9/1960 | Page | 180—22 |
| 3,024,038 | 3/1962 | Butler | 280—104.5 |

LEO FRIAGLIA, *Primary Examiner.*

A. HARRY LEVY, *Examiner.*

BENJAMIN HERSH, R. C. PODWIL,
*Assistant Examiners.*